United States Patent
Williams

[11] 3,756,540
[45] Sept. 4, 1973

[54] MINIMUM DRAG CIRCULATION PROFILE

[75] Inventor: Robert M. Williams, Chantilly, Va.

[73] Assignee: The United States of America as represented by the Secretary of the Navy, Washington, D.C.

[22] Filed: Aug. 6, 1971

[21] Appl. No.: 169,711

[52] U.S. Cl......... 244/35 R, 244/42 CC, 244/42 CD
[51] Int. Cl.............................................. B64c 3/14
[58] Field of Search................. 244/35 R, 40 R, 41, 244/42 R, 42 C, 42 CC, 42 CD, 44

[56] References Cited
UNITED STATES PATENTS

| | | | |
|---|---|---|---|
| 1,719,293 | 7/1929 | Gripon | 244/35 R |
| 2,123,096 | 7/1938 | Charpentier | 244/35 R |
| 3,016,213 | 1/1962 | Griswold | 244/42 CC |
| 3,476,336 | 11/1969 | Hertel | 244/42 C |
| 3,625,459 | 12/1971 | Brown | 244/35 R |

FOREIGN PATENTS OR APPLICATIONS 757,192   9/1956   Great Britain ........................ 244/35

Primary Examiner—Milton Buchler
Assistant Examiner—Barry L. Keimachter
Attorney—R. S. Sciascia, Q. E. Hodges et al.

[57] ABSTRACT

An airfoil chord is divided into five sections, each section producing a specialized flow over its respective surface. A first section extending from the leading edge to approximately the midpoint of the chord has a convex shape and produces laminar flow. The second section adjacent the first has a straight line surface with a negative slope which produces a transition from laminar flow to a turbulent flow. The turbulent flow region is followed by a region of minimum skin friction which has a concave surface. The chord trailing edge is a coanda profile. A tangential jet slot is placed at the trailing edge to blow over and around the coanda profile preventing flow separation and moving the stagnation region aft on the wing. The under surface is cambered to reduce the flow velocity.

8 Claims, 2 Drawing Figures

PRESSURE DISTRIBUTION

INVENTOR
Robert M. Williams

BY *O. E. Hodges*
ATTORNEY

MINIMUM DRAG CIRCULATION PROFILE

The invention described herein may be manufactured and used by or for the Government of the United States of America for Governmental purposes without the payment of any royalties thereon or therefore.

DESCRIPTION OF THE PRIOR ART

The basic purpose of this invention is to provide an airfoil having a high lift coefficient and high efficiencies at high Mach numbers.

The prior art shows many examples of a wing designed with the foregoing purpose. These prior art wings include thin, highly cambered laminar flow airfoils with sharp trailing edges. These foils are highly efficient at low lift coefficients and provide excellent lift/drag ratios when used in a high aspect ratio wing. However, these wings are necessarily extremely light due to the low lift capability and the wing span is limited by structural constraints imposed by the thin section. Also, these highly loaded wings are responsive to erratic weather conditions creating constraints on the structure and its operation.

The prior art also shows multiple surfaces mounted on wings which can be modified by inflation to change the shape of the airfoil, giving it a highly cambered shape producing high lift at low speed for take-offs and producing a wing shape most efficient for high altitude, high speed operation. This wing has a necessary drawback of high drag and of requiring additional control surface with associated control systems and appendages to modify the shape of the wing. In addition, these wings are incapable of the efficiencies at Mach number 0.6 that this invention is capable of.

SUMMARY OF THE INVENTION

This airfoil is configured to produce lift independently of incidence and can operate at approximately zero angle of attack. The airfoil has a conventional rounded trailing edge with one or more blowing slots and in this respect is similar to conventional circulation control airfoil design. The remaining geometry of the airfoil radically differs from conventional design and produces a highly improved pressure distribution over the wing surface.

The airfoil shape causes the airflow to be accelerated over the leading edge in a manner to produce maximum suction whereby maximum lift and thrust contribution is attained. The flow is accelerated to a point slightly past mid-chord. Between the leading edge and the mid-chord point a laminar boundary layer is maintained so the drag is minimized. At approximately mid-chord the shape of the upper surface of the wing changes to produce a constant adverse pressure gradient with the result that a low pressure laminar separation bubble is avoided and the flow becomes naturally turbulent without the need for artificial drag producing strips.

A third successive section is shaped to decelerate the flow from its peak velocity. The rate of deceleration is determined from boundary layer theory and corresponds to the condition at which the turbulent boundary layer is on the verge of separation so that skin friction drag is near zero.

The flow is decelerated to a finite velocity at the trailing edge slot. At the trailing edge beyond the slot the edge curvature with a radius of approximately 3 percent causes a rapid favorable increase in suction preventing separation of the turbulent layer. The trailing edge located at approximately 97 percent of the chord is a coanda profile and the jet flow is about the coanda trailing edge detaching on the lower surface at some trailing edge base pressure.

The lower airfoil surface is cambered slightly so pressure along it changes gradually while the surface curvature is small to stagnate the flow with the aim of minimizing flow velocity along the under surface. The boundary layer remains laminar along the entire under surface due to low local velocity.

Near mid-chord laminar deceleration is attained in the flow by shaping the lower surface to Exact Boundary Layer Theory and Gastèr's bubble criteria. Deceleration results in laminar separation at some trailing edge base pressure. The trailing edge region is constrained to produce maximum pressure recovery by gradually decreasing the radius as the upper surface is reached.

This airfoil offers several advantages over the prior art. The airfoil is characteristically thick varying from 35 percent thickness ratio at the wing root to 15 percent thickness ratio at the wing tips so that the wing has inherently high stiffness permitting the use of extremely high aspect ratio without incurring a penalty in structural weight. The efficiency of the wing can then be increased in this manner by increasing the ratio of aspect ratio to lift coefficient. Lift can be varied by varying the rate of blowing. High lift at low landing speeds can be generated by increasing the jet slot velocity and without increasing the angle of attack. In addition, this wing uses no control surfaces as control is accomplished by varying the rate of blowing. The wing is much less sensitive to eratic weather conditions than is a low wing loading aircraft. Because of the inherently high lift capability of this design, landing speeds can be reduced. With higher available lift landings can be safely made without fear of leading edge stall simply by reducing the angle of attack and producing a larger flowing volume through the blowing slots. In addition, the wing is considerably more efficient than is the prior art, producing higher lift at Mach number, 0.6.

DESCRIPTION OF THE INVENTION

Figure 1:
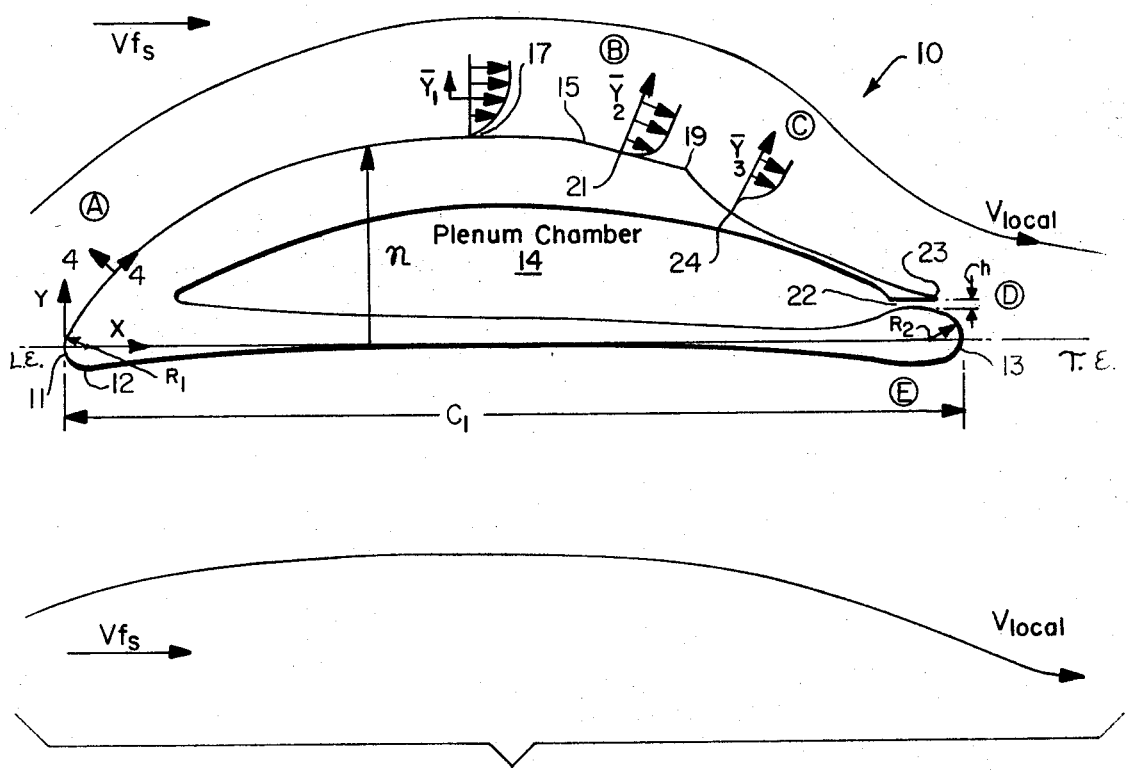
FIG. 1 is a cross-section of the airfoil, taken along the chord, with the chord line in the plane of the drawing with the airfoil sections shown.

The airfoil has the unique shape which is divided into geometric sections corresponding to the specialized flow produced over each section. The precise geometry of the airfoil depends on a particular design requirement of lift at particular Mach numbers but the airfoil is described generally with the understanding that the geometry of each section and of the whole airfoil may be varied without departing from the spirit of the invention.

The wing designated generally by numeral 10, comprises five sections, A-E. The shape of the airfoil is referenced to a two-dimensional cartesian coordinate system with the origin at the leading edge and with the distance along the chord, from the leading edge 11 to the trailing edge 13, being in the X axis and with the upper and lower surfaces being referenced to the Y axis. The free stream velocity is designated $V_{fs}$ while the flow surrounding the wing is designated $V_{local}$. The total length of the chord is designated by the reference letter $C_1$, while the distance of the upper and lower surfaces from the X axis corresponding to the chord, and with respect to a point along the X axis is designated $\eta$. A second set of dimensionless coordinates $(\overline{X},\overline{Y})$ describes points relative to the upper surface and the stagnation point 12, with $\overline{X}=0$, $\overline{Y}=0$ at the stagnation point and with $\overline{Y}$ being perpendicular to the surface and $\overline{X}$ being parallel to it. A plenum chamber 14 in the hollow portion inside the wing supplies pressurized air for a passage through a slot 22. The plenum chamber may be supplied with pressurized air from any suitable source.

The wing is now described with reference to the kind of flow produced over each of the five sections.

Laminar Acceleration Range

The laminar acceleration region is the region inclusive from the stagnation point reference numeral 12, to point 15, on the chord sections. This section is designated by the letter A. A portion of section A between points 11 and 13 has a shape according to the relationship $$\eta(X) = A_0 + A_1 X + A_2 X^2 + \ldots A_N X^n$$

with $R_1/C_1 \leq 0.04$ and where $R_1$ is the radius of curvature of the leading edge 11 and $C_1$ is the length of the chord and with $0 < d\eta/dX <$ (positive slope) and $f_1(X) \leq d^2\eta/dX^2 \leq 0$
where $f_1(X)$ is the minimum rate of change of curvature within this portion of section A, determined by the Laminar Instability Theory for a finite disturbance. As shown in the flow vector diagram at point 17, the flow is zero at the surface of the airfoil and increases as a function of the distance in the direction $\overline{Y}_1$ from the surface of the airfoil.

Generally, the region A extends approximately 50 percent of the chord section but this dimension may be varied depending upon the exact pressure distribution desired over the upper surface.

Instability Range

The instability region is designated generally by the reference letter B and includes the upper surface area between points 15 and 19. The stable laminar flow is caused to undergo transition in this region by introducing a straight line surface lying in a plane such that $d^2\eta/dX^2 = 0$ and where $f_2(X) \leq d\eta/dX < 0$ (negative slope). $f_2(X)$ is the minimum slope required to introduce transition and is determined from $V_{local}/V_{fs} = \mu = \alpha \overline{X}^m$ and $d\mu/dX = m\alpha \overline{X}^{m-1}$ where $\alpha$ and $m$ are constants and X is a dimensionless surface coordinate measured along the upper surface from the stagnation point 12. The effect of the planar surface with negative slope is to introduce a short constant adverse pressure gradient so a low pressure laminar separation bubble is avoided and the flow becomes turbulent naturally. The flow velocity over this surface is described at point 21 by the vector flow diagram with $\overline{Y}_2$ being perpendicular to surface B at 21.

Minimum Skin Friction Region

The minimum skin friction region is designated by letter C and includes the region between point 19 and point 23 which is shaped to cause the turbulent boundary layer to have minimum sheer stress at surface C. Surface C is described according to the relationship
$f_3(X) = d\eta/dX < 0$ (negative slope)
$f_4(X) = d^2\eta/dX^2 > 0$ (concave)

where $f_3(X)$ and $f_4(X)$ are complex functions determined from Turbulent Boundary Layer Theory which yields a large but constant shape factor and small skin friction. At point 23, immediately forward of the slot 22 the surface velocity is finite.

Pressure Recovery Region

The pressure recovery region is designated generally by letter D. In this region the unique feature of the coanda flow is used to turn the airstream as much as 180° and generates high lift while also preventing flow separation. The trailing edge is described as a coanda profile having a radius $R_2$ and a slot 22 with opening $h$ for blowing air from the plenum chamber over the trailing edge.

The geometry of the slot $h$ and radius $R_2$ is determined from the following dimensionless variables:
$h/R_2, R_2/C_1, h/C_1, C_\mu$
with the following limits of these variables as follows:
$0 < h/R_2 < 0.05$
$0.02 < R_2/C_1 \leq 0.05 \quad 0 < C_\mu \leq 0.2$
$C_\mu/2 = x(Vfs\ 1100)^2 \leq 0.05\ h/R_2$
where $C_\mu = 2e_jh/eC_1\ (V_j)/Vfs^2 = m_jV_j/qC_1$
The j subscript refers to the jet flow
$q = 2/2V_\infty^2 =$ free stream dynamic pressure
$m_j =$ mass flow from the jet slot
If $C_1$, the length of the chord is specified, $h$ and $R_2$ can be determined from the foregoing relationship.

Lower Surface

The lower surface is designated generally by the letter E and includes the region on the lower surface between leading edge 11 and trailing edge 13. In this region the shape is governed by Laminar Boundary Layer Theory such that $|d\eta/dX| \leq f_5(X) \quad |d^2\eta/dX^2| \leq f_6(X)$
where $f_5(X)$ and $f_6(X)$ are complex functions which require the curvature be small throughout to stagnate the under surface velocity and maximize pressure.

The preceeding expressions generally describe a wing curvature which develop the heretofore impractical combination of high efficiency, low drag and high critical Mach number at high lift coefficients, with enhanced wing structure.

Figure 2:
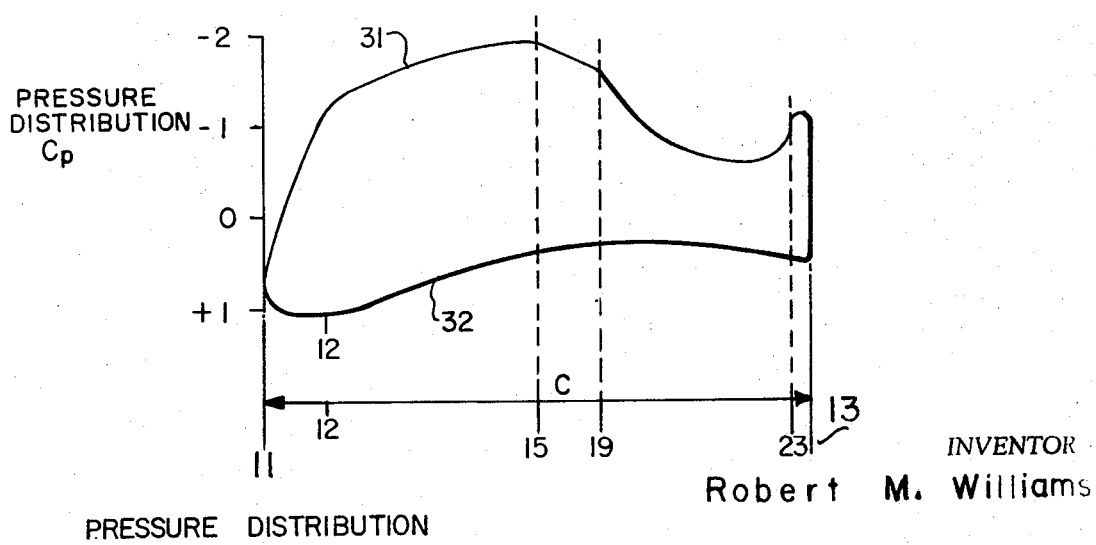
FIG. 2 is the pressure distribution along the airfoil's surface and referenced to its chord line.

The pressure distribution over the wings is shown in FIG. 2. As seen in the pressure distribution profile the jet slot blowing over the coanda profile trailing edge prevents separation of the trailing edge, permitting high pressure recovery. Although higher pressures are obtainable over the upper surface of the wing, the shape of the wing is designed for a lower than maximum obtainable lift in order to decrease the drag of the wing through the free stream.

In FIG. 2 the vertical axis represents the pressure distribution in terms of the pressure coefficient $C_p$. Distances along the length of the chord are marked in the reference numerals used in FIG. 1, corresponding to the sections A-D on the upper surfaces of the wing. As can be seen from FIG. 2, the flow stagnates at point 12 and pressure is built up. The flow is then accelerated between points 12 and 15 such that suction is increased. The pressure drops from positive through zero to negative pressure where at point 15, slightly past mid-chord, turbulence is introduced through a short constant adverse pressure gradient decreasing the suction and making the pressure more positive with the result that low pressure laminar separation bubble is avoided. Between points 19 and 23 the flow is decelerated, driving the pressure across the upper surface from its negative value towards zero until point 23, corresponding to the jet slot is reached. The jet slot blowing across the coanda profile enables boundary layer control and maintains the flow attached to the airfoil surface until the flow reaches some point on the lower surface where it detaches, moving the stagnation point further aft and maintaining a favorable pressure distribution across the upper surface.

Obviously many modifications and variations of the present invention are possible in the light of the above teachings. It is therefore to be understood that within the scope of the appended claims the invention may be practiced otherwise than as specifically described.

What is claimed is:

1. An airfoil comprising:
   a leading edge and a trailing edge;
   an upper surface continuous from said leading edge to a point adjacent said trailing edge and a lower surface continuous from said leading edge to said trailing edge;
   said upper surface including a first section for producing accelerated laminar flow, said first section being convex in relation to the chord connecting said leading edge with said trailing edge and extending from a point adjacent said leading edge to a point slightly past the middle of said chord;
   said upper surface including a second section for producing a constant adverse pressure gradient and turbulent flow, said second section being aft of and adjacent said first section and being described by a straight line having a negative slope with respect to said chord; and
   said upper surface including a third section for decelerating the flow from its peak velocity at a rate corresponding to the condition at which the turbulent boundary layer is on the verge of separation so that the skin friction drag is approximately zero, said third section being aft of and adjacent said second section and being concave with a negative slope with respect to said chord.

2. The airfoil of claim 1, wherein said trailing edge has a coanda profile and is separated from said third section by a blowing slot opening.

3. The airfoil of claim 2, wherein:
   said lower surface is cambered to decrease the flow velocity along said lower surface.

4. The airfoil of claim 2, wherein:
   said convex first section is shaped according to the relation $\eta(X) = A_0 + A_1 X + A_2 X^2 + \ldots A_n X^n$ where $\eta$ is the distance of any point on said upper surface from the X axis corresponding to said chord, X is a point on the chord and the origin of the X axis is at the leading edge; and
   $0 < d\eta/dX < \infty$ and
   $f_1(X) < d^2\eta/dX^2 \leq 0$
   where $f_1(X)$ is the minimum rate of change of curvature determined by the Laminar Instability Theory for a finite disturbance.

5. The airfoil of claim 4, wherein:
   said straight line second section has a slope $d\eta/dX$ such that $f_2(X) < d\eta/dX < 0$ and wherein $f_2(X)$ is the minimum slope required to introduce transition determined from the relationship
   $V_{local}/V_{freestream} = \mu = \alpha \overline{X}^m$ and $d\mu/d\overline{X} = m\alpha \overline{X}^{m-1}$ 6. The airfoil of claim 5, wherein:
   said concave third section is described by the relationship
   $f_3(X) = d\eta/dX < 0$
   $f_4(X) = d^2\eta/dX^2 > 0$
   wherein $f_3(X)$ and $f_4(X)$ are complex functions determined from Turbulent Boundary Layer Theory to produce minimum skin friction.

7. The airfoil of claim 6, where:
   said trailing edge has a constant radius of curvature $R_2$;
   said blowing slot opening and said radius of curvature are constrained by the relationship
   $0 < h/R_2 < 0.05$
   $0.02 < R_2/C_1 \leq 0.05$
   $0 < C\mu \leq 0.2$
   $C\mu/2 = x(V_{ft})^2/1100 \leq 0.05\ h/R_2$
   where $h$ is the cross section of the slot opening, $R_2$ is the trailing edge radius $C_1$ is the length of said chord and
   $C\mu = m_j V_j/qC_1$
   where $V_j$ = jet slot flow velocity
   $q$ = free stream dynamic pressure
   $m_j$ = mass flux 8. The airfoil of claim 7, wherein said lower surface between said leading edge and said trailing edge is governed by Laminar Boundary Layer Theory such that
   $|d\eta/dX| \leq f_5(X); d^2\eta/dX^2 \leq f_6(X)$
   where $f_5(X)$ and $f_6(X)$ are complex function which require the curvature produce a deceleration of flow along the under surface with increased pressure.

* * * * *